(12) United States Patent
Ito et al.

(10) Patent No.: US 6,583,819 B2
(45) Date of Patent: Jun. 24, 2003

(54) ELECTRONIC CAMERA WITH MOVABLE OPTICAL ELEMENT

(75) Inventors: Takayuki Ito, Saitama-ken (JP);
Masato Noguchi, Saitaman-ken (JP);
Makoto Mogamiya, Tokyo (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/881,776

(22) Filed: Jun. 18, 2001

(65) Prior Publication Data

US 2001/0053288 A1 Dec. 20, 2001

(30) Foreign Application Priority Data

Jun. 19, 2000 (JP) .......................................... 2000-182662

(51) Int. Cl.[7] ............................................... H04N 5/225
(52) U.S. Cl. ......................... 348/335; 348/342; 348/374
(58) Field of Search ................................. 348/342, 335, 348/340, 360, 361, 164, 218.1, 219.1

(56) References Cited

U.S. PATENT DOCUMENTS

| 4,543,601 A | * | 9/1985 | Harada et al. | ............ | 348/219.1 |
| 4,998,164 A | * | 3/1991 | Endo et al. | ............... | 348/219.1 |
| 5,063,450 A | * | 11/1991 | Pritchard | ................... | 348/219.1 |
| 5,561,460 A | * | 10/1996 | Katoh et al. | ............... | 348/219.1 |
| 5,982,423 A | * | 11/1999 | Sekiguchi | .................... | 250/330 |
| 6,195,125 B1 | * | 2/2001 | Udagawa et al. | ......... | 348/218.1 |
| 6,342,922 B1 | * | 1/2002 | Mizoguchi | ................... | 348/342 |

FOREIGN PATENT DOCUMENTS

| JP | 11243187 | 9/1999 |
| JP | 11282047 | 10/1999 |

* cited by examiner

Primary Examiner—Wendy R. Garber
Assistant Examiner—Matthew L Rosendale
(74) Attorney, Agent, or Firm—Greenblum & Bernstein, P.L.C.

(57) ABSTRACT

An electronic camera (digital camera) includes a taking optical system that forms an image of a subject, a lowpass filter and a CCD area sensor that captures the image formed by the taking optical system. The lowpass filter is mounted on a driving mechanism that moves it in the direction parallel to a light-receptive surface of the CCD. The driving mechanism consists of a pair of filter guides that support the filter, a pair of shafts that guide rectilinear movement of the filter, a cam disc that is rotated by a motor and a cam follower attached on the guide. When the picture is taken, the motor rotates the disk, which reciprocates the filter. Since the movement of the lowpass filter moves the shadow of the dust formed on the CCD area sensor, an influence of the shadow is diffused among a larger number of pixels.

16 Claims, 6 Drawing Sheets

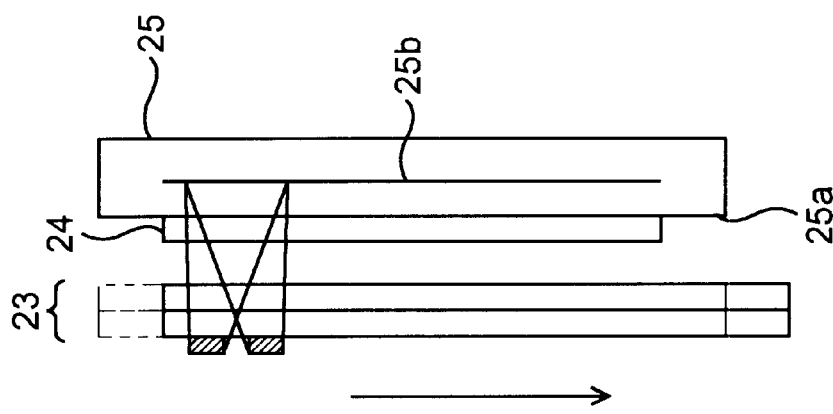
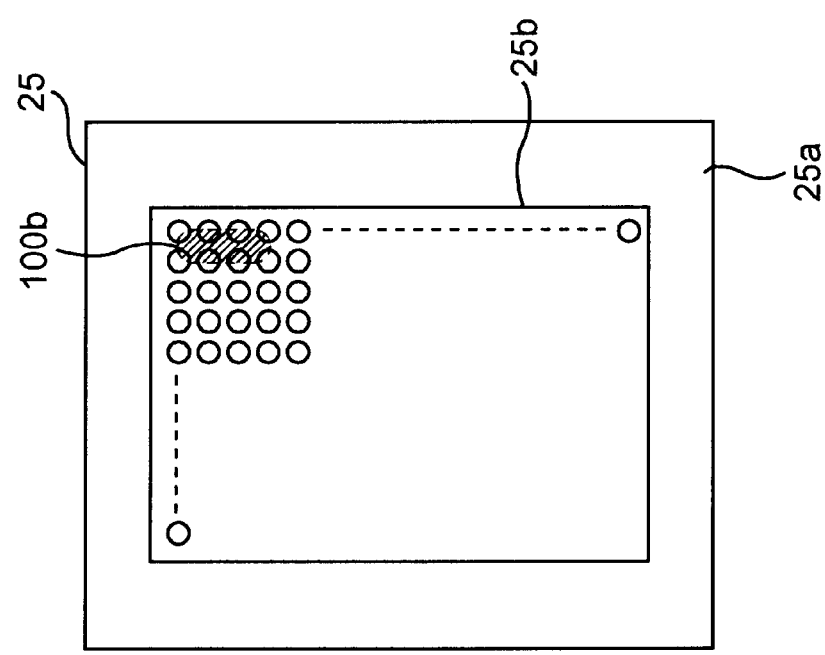

ELECTRONIC CAMERA WITH MOVABLE OPTICAL ELEMENT

BACKGROUND OF THE INVENTION

The present invention relates to an electronic camera (i.e., a digital camera) that is provided with an optical element such as a filter between a taking optical system and an image pickup device.

Electronic cameras such as still-video cameras that electronically retain data of freeze-frame pictures or video cameras that electronically retain data of moving video pictures spring into wide use. In the electronic camera, a subject image is formed through the taking optical system on the image pickup device. The image pickup device converts the optical image into electric signals by pixel, and then, the analog electric signals are converted to digital form to be retained in a recording medium.

In general, the electronic camera is provided with a filter such as a lowpass filter, an infrared absorbing filter or the like between the taking optical system and the image pickup device.

The lowpass filter is used to prevent moiré fringes. Since the image pickup device has the pixels that are systematically arranged on a light-receptive surface, when the spatial frequency of the subject image is closely approximate to the sampling spatial frequency that is determined by the pitch of the pixels, the moiré fringes appear in the image data. The lowpass filter reduces the intensity of the spatial frequency component that is close to the sampling spatial frequency. The lowpass filter is a single optical element that consists of a plurality of plates made of birefringent material such as crystal or lithium niobate. In general, the lowpass filter converts the subject image formed through the taking optical system into fourfold images that are deviated to one another by half pitch of the pixel pitch in the four perpendicular directions on the light-receptive surface in order to level out the high frequency component.

Further, the infrared absorbing filter removes the infrared light from the light from the subject. Since the image pickup device senses the infrared light as well as visible light, if the infrared absorbing filter is not provided, the color balance of the reproduced image based on the image data captured by the image pickup device should be different from that of the visual image for a naked eye. The infrared absorbing filter is used to match the color balances between the reproduced image and the visual image.

The various filters are likely to adsorb dust due to static electricity and the dust adsorbed on the filter reduces the quality of the image captured by the image pickup device.

Particularly, when the lowpass filter is made of ferroelecric crystal such as the lithium niobate having pyroelectricity, the filter is likely to adsorb the dust in a camera body because a slight temperature change generates polarization charge on the filter surface.

While the dust adsorbed on the filter can be cleaned by blowing air with a blower or a spray or by wiping with a blush or a cloth, it is necessary to remove the elements such as an interchangeable lens from the camera in order to clean the filter, which takes a lot of time.

Further, even if the filter is cleaned, dust is incorporated in the camera during assembly of the camera and is adsorbed on the filter due to the static electricity. Therefore, the cleaning is ineffectual.

SUMMARY OF THE INVENTION

It is therefore an object of the present invention to provide an electronic camera, which is capable of keeping the quality of image captured by the image pickup device even if the filter adsorbs dust.

For the above object, according to the present invention, there is provided an improved electronic camera, which includes: a taking optical system that forms a subject image; an image pickup device that converts the optical image formed thereon into electric signals; an optical element that is located between the taking optical system and the image pickup device, the optical element allowing to pass the light from the subject; and a driving mechanism that moves the optical element in a direction that is substantially parallel to a light-receptive surface of the image pickup device.

With this construction, the light from the subject passes through the taking optical system, and then the light is received by the image pickup device through the optical element that is moved by the driving mechanism. Since the movement of the optical element moves the shadow of the dust formed on the image pickup device, an influence of the shadow is diffused among a larger number of pixels, which reduces the influence upon the specific pixels on which the shadow is formed when the optical element is static. Therefore, the shadow of the dust becomes unobtrusive and there is no appreciable deterioration in image quality.

The driving mechanism may move the optical element when the image pickup device captures an image of a subject. The driving mechanism may consist of a motor and a cam mechanism that converts the rotational movement of the motor into reciprocating rectilinear movement to move the optical element. The driving mechanism may adopt any other mechanisms. For instance, the driving mechanism may rotate the optical element about the optical axis of the taking optical system, or the driving mechanism may move the optical element such that the center of the optical element rotates about the optical axis without changing its orientation. Further, since the driving mechanism is good enough to move the optical element in the direction perpendicular to the optical axis for some distance, the plane in which the optical element moves may be slightly inclined with the light-receptive surface.

The optical element that is moved by the driving mechanism may be a lowpass filter, an infrared absorbing filter or a combination thereof. Since the lowpass filter is designed such that a deviating direction of an extraordinary ray is determined with respect to an ordinary ray assuming that a incident ray is perpendicular to the incident surface, the driving mechanism is required to move the lowpass filter while keeping it perpendicular to the optical axis of the taking optical system.

DESCRIPTION OF THE ACCOMPANYING DRAWINGS

FIG. 6A shows the shadow of dust formed on the CCD area sensor with movement;

FIG. 6B shows an optical path of light to form the shadow of dust with movement; and FIG. 6C is a graph showing reduction of CCD charge with movement.

DESCRIPTION OF THE EMBODIMENTS

Figure 1:
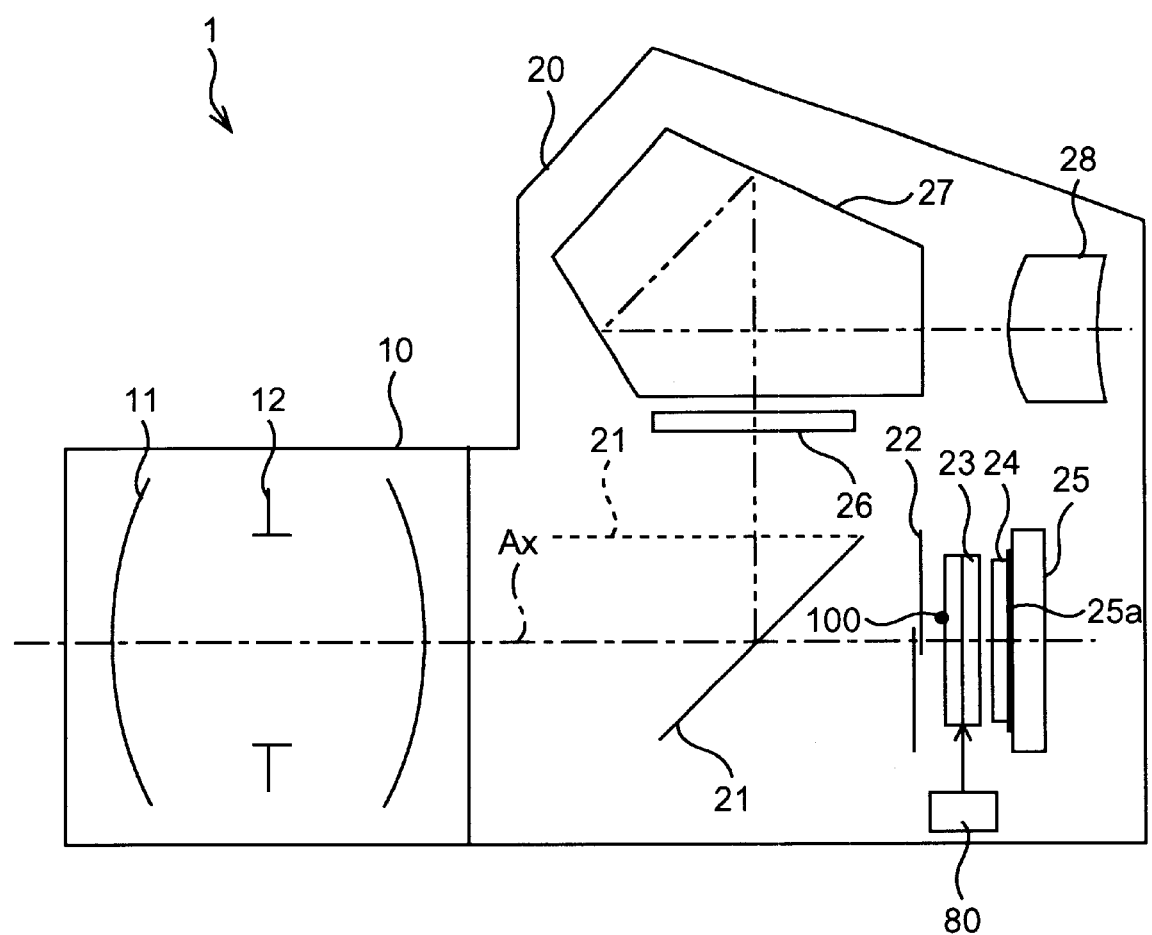
FIG. 1 shows an arrangement of optical elements and a driving mechanism in the electronic camera embodying the invention.
Figure 2:
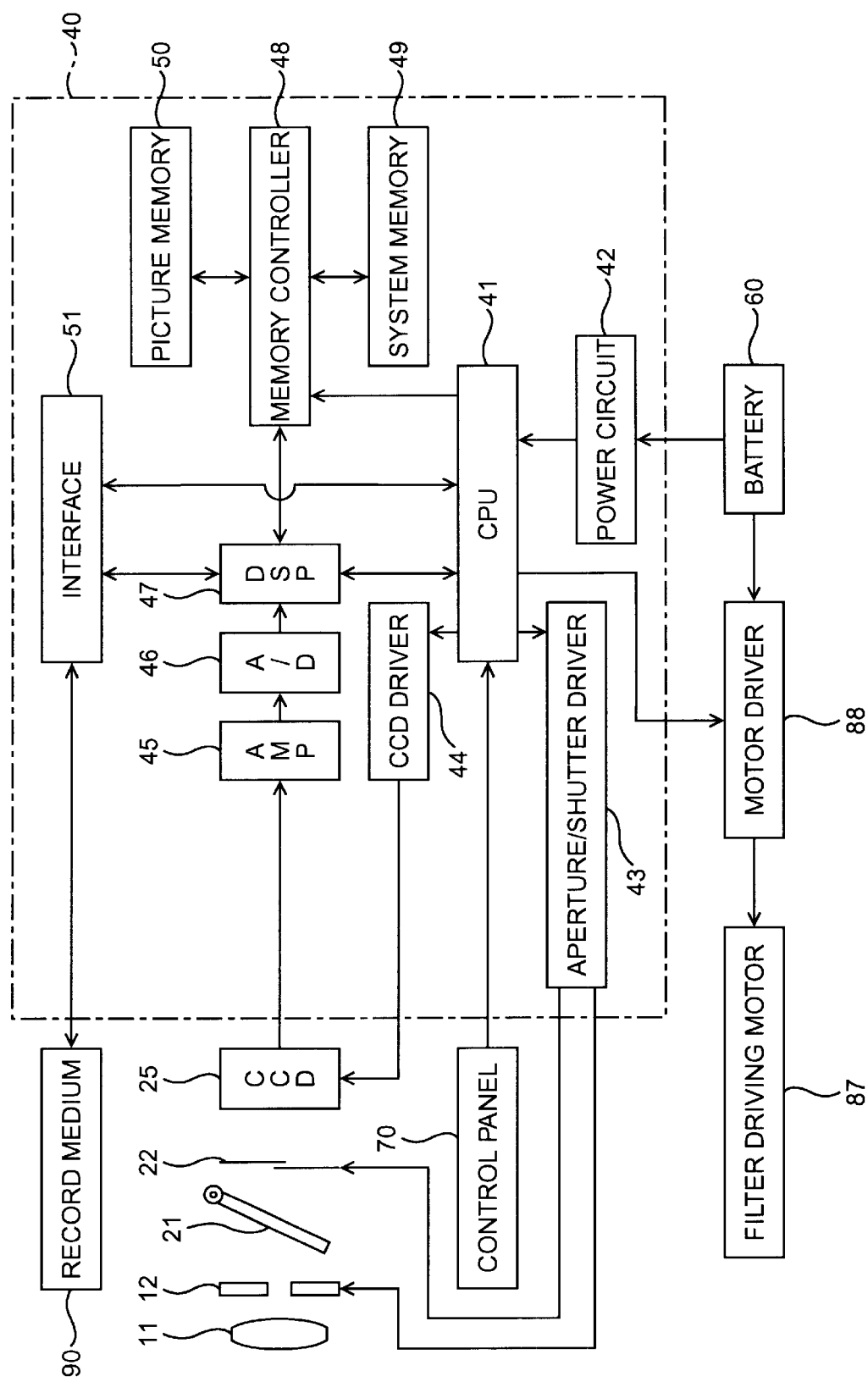
FIG. 2 is a block diagram showing electronic construction of the electronic camera embodying the invention.

An embodiment of an electronic camera according to the present invention will be described with reference to the drawings. FIG. 1 shows an arrangement of optical elements in a digital camera 1 that is an embodiment of the present invention. FIG. 2 is a block diagram showing electronic construction of the digital camera 1.

The digital camera 1 is a single lens reflex camera where an interchangeable lens barrel 10 is attached on a camera body 20. A taking optical system 11 including an aperture stop 12 is mounted in the lens barrel 10. In the camera body 20, a main reflex mirror 21, a focal plane shutter 22, a lowpass filter 23, an infrared absorbing filter 24, a CCD area sensor 25, a focusing screen 26, a pentagonal dachprism 27 and an eyepiece lens 28 are installed. The taking optical system 11 forms a subject image on a light-receptive surface 25a of the CCD area sensor 25. The CCD area sensor 25 is an image pickup device that converts the optical image formed thereon into electric signals. The lowpass filter 23 is an optical element located between the taking optical system 11 and the CCD area sensor 25.

A driving mechanism 80 in the camera body 20 has a function to move the lowpass filter 23 in the direction parallel to the light-receptive surface 25a (in the direction perpendicular to the sheet of FIG. 1). The infrared absorbing filter 24 is cemented to the light-receptive surface 25a.

The optical axis Ax of the taking optical system 11 passes through the center of the light-receptive surface 25a and is perpendicular to both of the lowpass filter 23 and the light-receptive surface 25a.

The main reflex mirror 21 is in the position as illustrated by the solid line in FIG. 1 when the picture is not taken. When the picture is taken, the main mirror 21 jumps to the position as illustrated by the dotted line. As a result, when the main reflex mirror 21 is in the solid line position, the light from a subject passing through the taking optical system 11 is reflected by the main reflex mirror 21 and forms an image on the focusing screen 26 that is located at an optically equivalent position to the light-receptive surface 25a. A reverted image formed on the focusing screen 26 is erected by means of the pentagonal dachprism 27 and is observed through the eyepiece lens 28 under magnification. On the other hand, when the main reflex mirror 21 is in the dotted line position, the light from a subject can impinge the CCD area sensor 25 through the lowpass filter 23 and the infrared absorbing filter 24.

The focal plane shutter 22 located between the main reflex mirror 21 and the lowpass filter 23 moves a slit formed between front and rear curtains across the light-receptive surface 25a at the predetermined velocity and exposes the light-receptive surface 25a to the light from a subject through the taking optical system 11 progressively.

The lowpass filter 23 converts the subject image formed through the taking optical system 11 into fourfold images that are deviated to one another by half pitch of the pixel pitch in the four perpendicular directions on the light-receptive surface 25a. Further, the infrared absorbing filter 24 removes the infrared light from the light from the subject.

The optical image formed on the light-receptive surface 25a of the CCD area sensor 25 is converted into electric signals by pixel. The analog electric signal from the CCD area sensor 25 is converted to digital form by a built-in circuit 40 and are retained as digital image data.

The built-in circuit 40 is, as shown in FIG. 2, provided with a CPU 41, a power circuit 42, an aperture/shutter driver 43, a CCD driver 44, an amplifier (AMP) 45, an analog/digital (A/D) converter 46, a digital signal processor (DSP) 47, a memory controller 48, a system memory 49, a picture memory 50 and an interface 51.

The power circuit 42 supplies electric source from a battery 60 to the CPU 41. The CPU 41 controls the aperture/shutter driver 43, the CCD driver 44, the DSP 47, the memory controller 48 and a motor driver 88 that drives a filter driving motor 87 of the driving mechanism 80 according to various programs installed in the system memory 49 and instructions input from a control panel 70. The CPU 41 accesses the system memory 49 in which various programs and data are installed through the memory controller 48. The picture memory 50 is used to temporally retain the image data captured by the CCD area sensor 25. The memory controller 48 controls data transmission among the system memory 49, the picture memory 50 and the DSP 47.

The aperture/shutter controller 43 controls the opening diameter of the aperture stop 12 and the operation of the focal plane shutter 22 when the picture is taken according to the commands from the CPU 41.

The electric signals from the CCD area sensor 25 that is controlled by the CCD driver 44 are transmitted to the AMP 45. The amplified electric signals by the AMP 45 are converted to digital form by the A/D converter 46 and then they are transmitted to the DSP 47.

The DSP 47 records the digital image signals onto the picture memory 50 according to the commands from the CPU 41. Further, the DSP 47 reads the image data recorded on the picture memory 50, processes the image data and records the processed image data on the picture memory 50. In the DSP 47, the image data is subjected to image processing such as shading-correction, gamma-correction or scaling.

The interface circuit 51 records the processed image data from the DSP 47 onto the recording medium 90. The recording medium 90 is a removable media, which can be removed from the camera body 20, such as a PC card or a compact flash memory card.

The control panel 70 is provided with various buttons and/or dials including a shutter release button (not shown) and transmits the instructions of a user to the CPU 41. The CPU 41 issues command to the dependent devices based on the instructions. For instance, when the shutter release button is depressed, the CPU 41 issues the exposure start command to the aperture/shutter driver 43 to set the opening diameter as the value determined by the TTL metering and to drive the focal plane shutter 22 at the slit width and the shutter speed that are determined based on the sensitivity of the CCD area sensor 25 and the subject brightness.

The power circuit 42 is connected to the battery 60 that supplies electric source to the built-in circuit 40 and the motor driver 88 of the driving mechanism 80. The battery 60 is removable and rechargeable.

Next, details of the driving mechanism 80 will be described.

Figure 3:
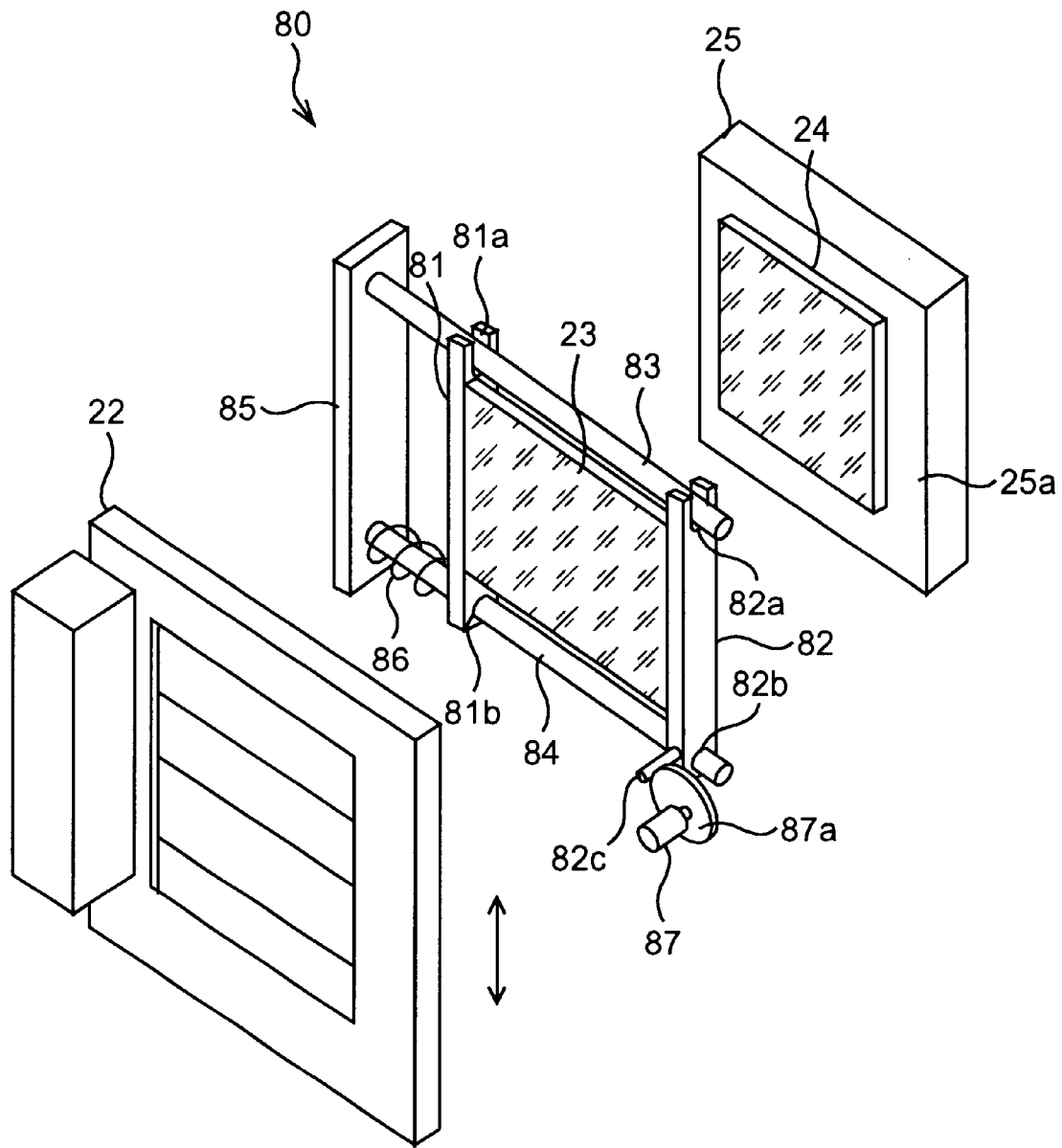
FIG. 3 is an exploded perspective view showing the mechanical construction between a focal plane shutter and a CCD area sensor.
Figure 4A:
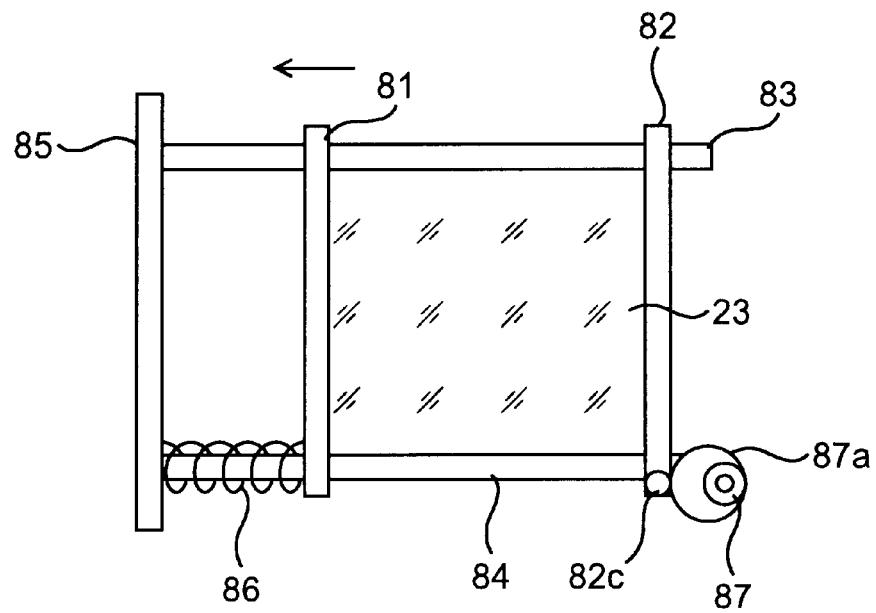
FIGS. 4A and 4B show the movement of a lowpass filter.
Figure 4B:
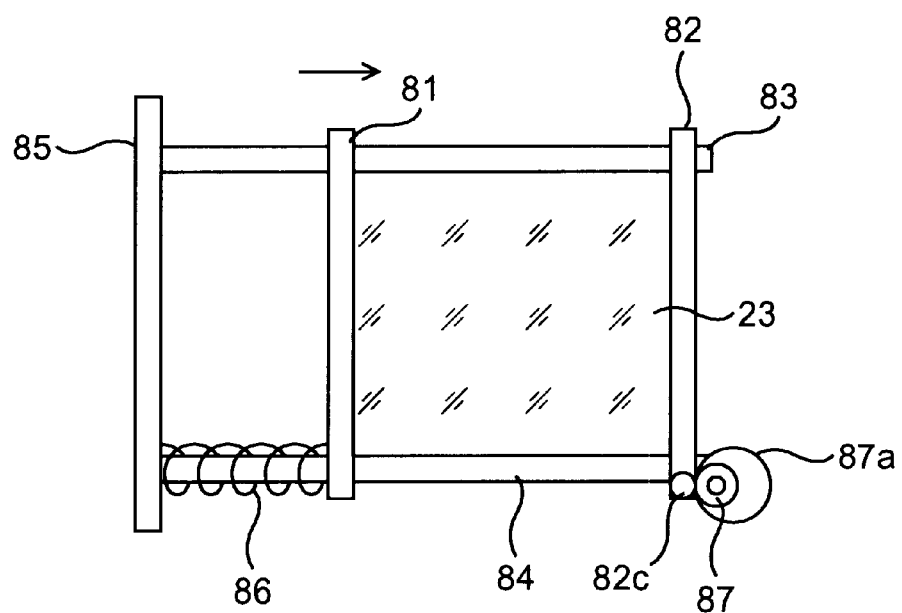

FIG. 3 is an exploded perspective view showing the mechanical construction of the digital camera 1 between the focal plane shutter 22 and the CCD area sensor 25. Further, FIGS. 4A and 4B show the movement of the lowpass filter 23 moved by the driving mechanism 80.

As described above, the lowpass filter 23 mounted on the driving mechanism 80 is arranged to be parallel to the light-receptive surface 25*a* of the CCD area sensor 25. Further, the focal plane shutter 22 is also parallel to both of the lowpass filter 23 and the light-receptive surface 25*a*. In the following description, the direction in which the front and rear curtains move is referred to as an "up-and-down direction" shown by an arrow in FIG. 3, and the direction perpendicular to the up-and-down direction in the light-receptive surface 25*a* is referred to as a "right-and-left direction". Still further, the direction along the optical axis Ax of the taking optical system 11 is referred to as an "optical axis direction" that is perpendicular to the light-receptive surface 25*a*.

The driving mechanism 80 is provided with a left filter guide 81, a right filter guide 82 having a cam follower 82*c*, parallel shafts 83 and 84, a coil spring 86, a filter driving motor 87 having a cam disc 87*a* on its rotating shaft, and the motor driver 88.

The lowpass filter 23 mounted on the driving mechanism 80 has a square plate that is larger than a image pickup area of the light-receptive surface 25*a* of the CCD area sensor 25. At the right and left sides of the lowpass filter 23, the right and left filter guides 81 and 82 are attached to the lowpass filter 23. The length of each filter guide is longer than the length of the lowpass filter 23 in the up-and-down direction and both the up and down ends of the filter guides 81 and 82 are jutted from the up and down sides of the lowpass filter 23.

U-shaped notches 81*a*, 81*b*, 82*a* and 82*b* are formed at the up and down ends of the filter guides 81 and 82. The upper shaft 83 is engaged in the upper notches 81*a* and 82*a*, the lower shaft 84 is engaged in the lower notches 82*b* and 82*b*, and thereby the lowpass filter 23 is supported by the shafts 83 and 84. The lowpass filter 23 is movable in the right-and-left direction along the shafts 83 and 84. The notches 81*a*, 81*b*, 82*a* and 82*b* act as guides for the parallel movement of the lowpass filter 23.

The shafts 83 and 84 are fixed to a base plate 85 that is fixed to the camera body 20 and the coil spring 86 is arranged around the shaft 84 between the base plate 85 and the left filter guide 81.

Further, the cam follower 82*c* is attached to the lower end of the right filter guide 82. The cam follower 82*c* is formed as a stick jutted in the optical axis direction and is forced to contact the limb of the cam disc 87*a* by the elastic force of the coil spring 86.

The disc 87*a* is fixed to the rotating shaft of the filter driving motor 87 at the decentered position. The combination of the cam follower 82*c* and the cam disc 87*a* converts the rotational movement of the filter driving motor 87 into reciprocating rectilinear movement. Therefore, the lowpass filter 23 reciprocates in the right-and-left direction as shown in FIGS. 4A and 4B when the filter driving motor 87 operates.

The filter driving motor 87 is controlled by the motor driver 88 that operates according to the command from the CPU 41. When the picture is taken, the CPU 41 issues the driving command to the motor driver 88 such that the lowpass filter 23 moves in one of right and left direction during the operation of the focal plane shutter 22 (i.e., during the accumulation of charge of the CCD area sensor 25). When the shutter speed is lower than the predetermined value, the lowpass filter 23 is reciprocated.

The effect of the movement of the lowpass filter 23 will be described.

Figure 5C:
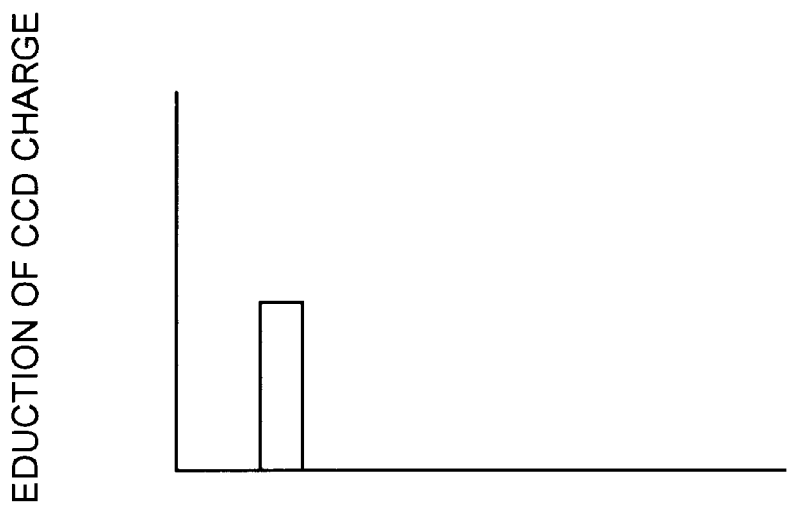
FIG. 5C is a graph showing reduction of CCD charge without movement.
Figure 5B:
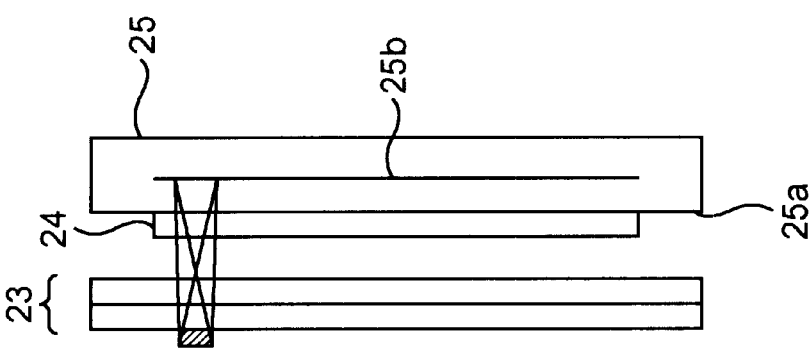
FIG. 5B shows an optical path of light to form the shadow of dust without movement.
Figure 5A:
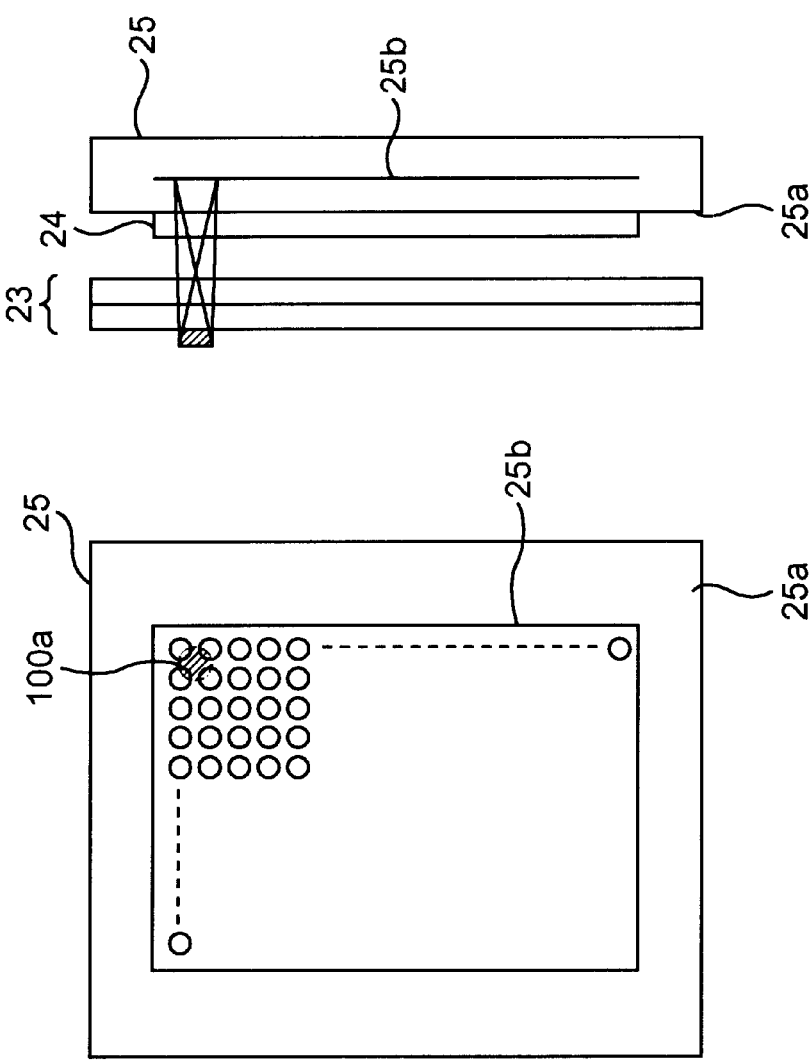
FIG. 5A shows the shadow of dust formed on the CCD area sensor without movement.

FIGS. 5A–5C show the conditions when the driving mechanism 80 does not operate. FIGS. 6A–6C show the conditions when the driving mechanism 80 operates. FIGS. 5A and 6A show the shadow of dust adsorbed on the lowpass filter formed on the CCD area sensor 25; FIGS. 5B and 6B show the optical path of light to form the shadow of the dust; and FIGS. 5C and 6C are graphs showing reduction of CCD charge. In the description, it is assumed that the intensity of the light from a subject is consistent across the entire area of the light-receptive surface 25*a* and the accumulating charge is consistent in every pixel of the CCD area sensor 25 when the dust is not adsorbed on the lowpass filter 23.

As shown in FIG. 1, when one particle of dust 100 is adsorbed on the front surface of the lowpass filter 23, the light from the subject forms a shadow 100*a* of the dust 100 on the light-receptive surface 25*a* of the CCD area sensor 25 (see FIGS. 5A and 5B).

The charge accumulated in the photoreceiving portion 25*b* for unit time of a pixel that is covered by the shadow 100*a* is lower than that of a pixel that is not covered by the shadow 100*a*. The graph of FIG. 5C shows the reduction of the CCD charge of the pixels that are covered by the shadow with reference to the CCD charge of the pixels that are not covered by the shadow.

On the other hand, when the lowpass filter 23 moves while keeping parallel arrangement to the light-receptive surface 25*a*, the shadow 100*b* of the dust 100 that is the same size as that of FIG. 5A becomes larger than the shadow 100*a* (see FIGS. 6A and 6B).

Since the movement of the lowpass filter 23 moves the shadow of the dust formed on the CCD area sensor 25, an influence of the shadow is diffused among a larger number of pixels, which reduces the influence upon the specific pixels on which the shadow is formed when the lowpass filter 23 is static.

The eight pixels are covered by the shadow 100*b* in FIG. 6A, while the four pixels are covered by the shadow 100*a* in FIG. 5A. However, the reduction of the CCD charge when the lowpass filter 23 is moved is smaller than that when the lowpass filter 23 is not moved (see FIGS. 5C and 6C).

Namely, although the total sum of the reduction of CCD charge caused by the dust 100 is constant (the area of the rectangle of FIG. 5C is equal to the area of the rectangle of FIG. 6C), the movement of the lowpass filter 23 diffuses the reduction among a larger number of pixels. As a result, the shadow 100*b* of the dust 100 becomes unobtrusive in the subject image on the light-receptive surface 25*a*.

Therefore, according to the digital camera 1 of the embodiment, when dust is adsorbed on the surface of the lowpass filter 23, the shadow of the dust is diffused by moving the lowpass filter 23, which prevents the deterioration in the quality of the image captured by the CCD area sensor 25.

As described above, the electronic camera of the present invention can prevent appreciable deterioration in image quality even when dust is adsorbed on the filter through which the light from the subject passes.

The present disclosure relates to the subject matter contained in Japanese Patent Application No. 2000-182662, filed on Jun. 19, 2000, which is expressly incorporated herein by reference in its entirety.

What is claimed is:

1. An electronic camera comprising:

a taking optical system that forms a subject image;

an image pickup device that converts an optical image formed thereon into electric signals;

an optical element that is located between said taking optical system and said image pickup device, said optical element allowing the light from the subject to pass therethrough; and a driving mechanism that reciprocally and linearly moves said optical element in a direction that is substantially parallel to a light-receptive surface of said image pickup device, wherein said driving mechanism moves said optical element while said image pickup converts the optical image into electric signals.

2. The electronic camera according to claim 1, further comprising a shutter located between said taking optical system and said optical element, wherein said driving mechanism moves said optical element while said shutter opens.

3. The electronic camera according to claim 1, wherein said optical element comprises a lowpass filter.

4. The electronic camera according to claim 1, wherein said optical element comprises an infrared absorbing filter.

5. The electronic camera according to claim 1, wherein said image pickup device comprises a CCD area sensor.

6. The electronic camera according to claim 2, wherein said driving mechanism comprises a motor and a cam mechanism that converts rotational movement of said motor into reciprocating rectilinear movement to move said optical element.

7. The electronic camera according to claim 2, wherein said optical element comprises a lowpass filter.

8. The electronic camera according to claim 2, wherein said optical element comprises an infrared absorbing filter.

9. The electronic camera according to claim 2, wherein said image pickup device comprises a CCD area sensor.

10. The electronic camera according to claim 2, wherein said optical element is supported by a pair of guides which are configured to move along a pair of parallel shafts.

11. An electronic camera comprising:

a taking optical system that forms a subject image;

an image pickup device that converts an optical image formed thereon into electric signals;

an optical element that is located between said taking optical system and said image pickup device, said optical element allowing the light from the subject to pass therethrough; and a driving mechanism that moves said optical element in a direction that is substantially parallel to a light-receptive surface of said image pickup device, said driving mechanism comprising a motor and a cam mechanism that converts rotational movement of said motor into reciprocating rectilinear movement to move said optical element, wherein said driving mechanism moves said optical element while said image pickup converts the optical image into electric signals.

12. The electronic camera according to claim 11, wherein said optical element comprises a lowpass filter.

13. The electronic camera according to claim 11, wherein said optical element comprises an infrared absorbing filter.

14. The electronic camera according to claim 11, wherein said image pickup device comprises a CCD area sensor.

15. The electronic camera according to claim 11, wherein said optical element is supported by a pair of guides which are configured to move along a pair of parallel shafts.

16. An electronic camera comprising:

a taking optical system that forms a subject image;

an image pickup device that converts an optical image formed thereon into electric signals;

an optical element that is located between said taking optical system and said image pickup device, said optical element allowing the light from the subject to pass therethrough, wherein said optical element is supported by a pair of guides which are configured to move along a pair of parallel shafts; and a driving mechanism that moves said optical element in a direction that is substantially parallel to a light-receptive surface of said image pickup device, wherein said driving mechanism moves said optical element while said image pickup converts the optical image into electric signals.

* * * * *